United States Patent
Wu

(10) Patent No.: US 10,009,076 B2
(45) Date of Patent: Jun. 26, 2018

(54) METHOD AND APPARATUS FOR OBTAINING DOWNLINK DATA IN A MASSIVE MIMO SYSTEM

(71) Applicant: Alcatel Lucent, Boulogne Billancourt (FR)

(72) Inventor: Keying Wu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 15 days.

(21) Appl. No.: 15/317,216

(22) PCT Filed: Jun. 12, 2014

(86) PCT No.: PCT/CN2014/079721
§ 371 (c)(1),
(2) Date: Dec. 8, 2016

(87) PCT Pub. No.: WO2015/188341
PCT Pub. Date: Dec. 17, 2015

(65) Prior Publication Data
US 2017/0126295 A1    May 4, 2017

(51) Int. Cl.
*H04B 7/0456* (2017.01)
*H04W 72/04* (2009.01)
*H04B 7/0452* (2017.01)

(52) U.S. Cl.
CPC ......... *H04B 7/0456* (2013.01); *H04B 7/0452* (2013.01); *H04W 72/042* (2013.01)

(58) Field of Classification Search
None
See application file for complete search history.

(56) References Cited

U.S. PATENT DOCUMENTS 8,559,545 B2 * 10/2013 Chen .................... H04B 7/0452
                                                    375/260
9,723,625 B2 *  8/2017 Yu ..................... H04W 72/1273
(Continued)

FOREIGN PATENT DOCUMENTS

CN          101636929 A       1/2010
CN          102833047 A       12/2012
(Continued)

OTHER PUBLICATIONS

Sung, Chang Kyung, et al., M-PSK Codebook Based Clustered MIMO-OFDM SDMA with Efficient Codebook Search, 2012 IEEE 75th Vehicular Technology Conference, (VTC Spring 2012), Yokohama, Japan, May 6-9, 2012.
(Continued)

*Primary Examiner* — Bunjob Jaroenchonwanit
(74) *Attorney, Agent, or Firm* — Fay Sharpe, LLP

(57) ABSTRACT

An objective of the application is to provide a method and apparatus for obtaining downlink data in a massive MIMO system. Specifically, the base station transmits a downlink control signaling indicating downlink channel estimation information to a user equipment, wherein the downlink control signaling comprises corresponding effective channel mean value information; performs zero-forcing precoding to a to-be-transmitted signal on each subcarrier of a transmission sub-band; transmits the zero-forcing precoded signal to the user equipment. Compared with the prior art, the base station in the present application can perform zero-forcing precoding to signals on each subcarrier and transmitting a DL control signaling indicating downlink channel estimation information to a user equipment, such that the user equipment can perform demodulation based on an effective channel mean value information in the DL control signaling but does not rely on the DL reference signal, thereby (Continued)

achieving reduction of precoding granularity and signaling overheads, system performance also be enhanced greatly.

11 Claims, 4 Drawing Sheets

(56) References Cited

U.S. PATENT DOCUMENTS

| | | | |
|---|---|---|---|
| 2004/0110510 A1* | 6/2004 | Jeon | H04L 1/20 455/450 |
| 2004/0259514 A1* | 12/2004 | Nissila | H04L 1/0026 455/226.1 |
| 2007/0230373 A1 | 10/2007 | Li et al. | |
| 2007/0280116 A1* | 12/2007 | Wang | H04B 7/0417 370/236 |
| 2008/0225960 A1* | 9/2008 | Kotecha | H04B 7/0413 375/259 |
| 2008/0260051 A1 | 10/2008 | Boccardi et al. | |
| 2008/0316935 A1* | 12/2008 | Bala | H04B 7/0408 370/252 |
| 2010/0056171 A1* | 3/2010 | Ramprashad | H04W 16/10 455/452.1 |
| 2010/0284483 A1 | 11/2010 | Jongren | |
| 2011/0009140 A1* | 1/2011 | Hwang | H04W 16/16 455/509 |
| 2011/0177834 A1* | 7/2011 | Shin | H04J 11/0033 455/501 |
| 2012/0140848 A1* | 6/2012 | Lin | H04B 7/0413 375/296 |
| 2012/0281659 A1* | 11/2012 | Zhang | H04B 7/0619 370/329 |
| 2013/0142128 A1 | 6/2013 | Yang et al. | |
| 2013/0237212 A1* | 9/2013 | Khayrallah | H04L 25/03949 455/423 |
| 2013/0244716 A1 | 9/2013 | Lee et al. | |
| 2013/0286911 A1* | 10/2013 | Lee | H04W 52/0219 370/311 |
| 2014/0314166 A1* | 10/2014 | Gomadam | H04B 7/0452 375/267 |
| 2015/0003350 A1* | 1/2015 | Yu | H04W 72/1273 370/329 |
| 2015/0043463 A1* | 2/2015 | Yamazaki | H04W 16/28 370/329 |
| 2015/0304063 A1* | 10/2015 | Zhu | H04W 72/12 370/329 |
| 2016/0119941 A1* | 4/2016 | Ko | H04W 52/04 455/453 |
| 2017/0325203 A1* | 11/2017 | Seo | H04L 5/0048 |

FOREIGN PATENT DOCUMENTS

| | | |
|---|---|---|
| CN | 103138895 A | 6/2013 |
| CN | 103532606 A | 1/2014 |
| WO | WO 2013/129502 | 9/2013 |

OTHER PUBLICATIONS

International Search Report for PCT/CN2014/079721 dated Mar. 13, 2015.

\* cited by examiner

METHOD AND APPARATUS FOR OBTAINING DOWNLINK DATA IN A MASSIVE MIMO SYSTEM

FIELD OF THE APPLICATION

The present application relates to the field of communication technologies, and more specifically, relates to a technique for obtaining downlink data in a massive MIMO system.

BACKGROUND OF THE APPLICATION

In conventional MIMO (Multiple Input Multiple Output) systems, DL (downlink) precoding is usually performed on per sub-band which consists more consecutive subcarriers (such as consisting of 60 consecutive subcarriers), so DL reference signals can be inserted in each sub-band to facilitate the estimation of the DL effective channel. The size of the sub-band must be smaller than the correlation bandwidth of the channel, so that channels within one sub-band can be roughly regarded as flat. All subcarriers within one sub-band can use the same precoding matrix, which is calculated from the average CSI (Channel State Information) of this sub-band. Then using the same precoding matrix to perform precoding to reference signals, and the precoded reference signals are then inserted in each sub-band. At the user side, each user estimates the effective channel on a per sub-band basis using the DL reference signals.

The disadvantage of per sub-band precoding is the additional multiuser interference resulted from the mismatch between the precoding matrix (calculated from the average CSI) and the actual channel on each subcarrier. The advantage of per sub-band precoding is that it allows the insertion of reference signals to aid DL effective channel estimation. But, with the growth of antenna number, the advantage of per sub-band precoding shrinks and its disadvantage expands. So, in a massive MIMO system, the smaller precoding granularity is preferred in frequency, but since the overhead of reference signal increases with the reduce of the precoding granularity, it makes it hard to DL channel estimation.

SUMMARY OF THE APPLICATION

An objective of the application is to provide a method and apparatus for obtaining downlink data in a massive MIMO system.

According to one aspect of the application, there provides a method, at a base station end, for obtaining downlink data in a massive MIMO system, comprising:

transmitting a downlink control signaling indicating downlink channel estimation information to a corresponding user equipment, wherein the downlink control signaling comprises corresponding effective channel mean value information;

wherein the method further comprises:

a. performing zero-forcing precoding to a to-be-transmitted signal on each subcarrier of a transmission sub-band;

b. transmitting the zero-forcing precoded signal to the user equipment.

According to another aspect of the application, there provides a method, at a user equipment end, for facilitating obtaining downlink data in a massive MIMO system, comprising:

receiving a downlink control signaling indicating downlink channel estimation information, which is transmitted by a corresponding base station, wherein the downlink control signaling comprises corresponding effective channel mean value information;

wherein the method further comprises:

A. receiving a signal transmitted by the base station, wherein, the signal is derived from performing zero-forcing precoding to a to-be-transmitted signal on each subcarrier of a transmission subband;

B. performing demodulation processing to the signal according to said effective channel mean value information to obtain corresponding downlink data.

According to one aspect of the application, there provides a base station end for obtaining downlink data in a massive MIMO system, comprises:

a first transmitting apparatus configured to transmit a downlink control signaling indicating downlink channel estimation information to a corresponding user equipment, wherein the downlink control signaling comprises corresponding effective channel mean value information;

wherein base station further comprises:

a precoding apparatus configured to perform zero-forcing precoding to a to-be-transmitted signal on each subcarrier of a transmission sub-band;

a second transmitting apparatus configured to transmit the zero-forcing precoded signal to the user equipment.

According to another aspect of the application, there provides a user equipment end for facilitating obtaining downlink data in a massive MIMO system, comprising:

a first receiving apparatus configured to receive a downlink control signaling indicating downlink channel estimation information, which is transmitted by a corresponding base station, wherein the downlink control signaling comprises corresponding effective channel mean value information;

wherein the user equipment further comprises:

a second receiving apparatus configured to receive a signal transmitted by the base station, wherein, the signal is derived from performing zero-forcing precoding to a to-be-transmitted signal on each subcarrier of a transmission sub-band;

a demodulation apparatus configured to perform demodulation processing to the signal according to said effective channel mean value information to obtain corresponding downlink data.

According to another aspect of the application, there provides a system for obtaining downlink data in a massive MIMO system, wherein, the system comprises a base station aforesaid according to one aspect of the application and a user equipment aforesaid according to another aspect of the application.

Compared with the prior art, by performing, at the base station end, zero-forcing precoding to signals on each subcarrier and transmitting a DL control signaling indicating downlink channel estimation information to a corresponding user equipment, the present application enables the user equipment to perform demodulation based on an effective channel mean value information in the DL control signaling, thereby achieving reduction of precoding granularity and signaling overheads in a massive MIMO system, as well as achieving DL channel estimation; moreover, compared with the prior art (DL channel estimation based on the reference signal), system performance will also be enhanced greatly; meanwhile, the user equipment needn't rely on the DL reference signal to perform DL effective channel estimation. Therefore, the present application is easy to implement.

BRIEF DESCRIPTION OF THE ACCOMPANYING DRAWINGS

Other features, objectives, and advantages of the present application will become more apparent through reading detailed depiction of the non-limiting embodiments made with reference to the accompanying drawings.

Same or similar reference numerals in the accompanying drawings represent same or similar components.

DETAILED DESCRIPTION OF THE PREFERRED EMBODIMENTS

Hereinafter, the present application will be described in detail with reference to the accompanying drawings.

Figure 1:
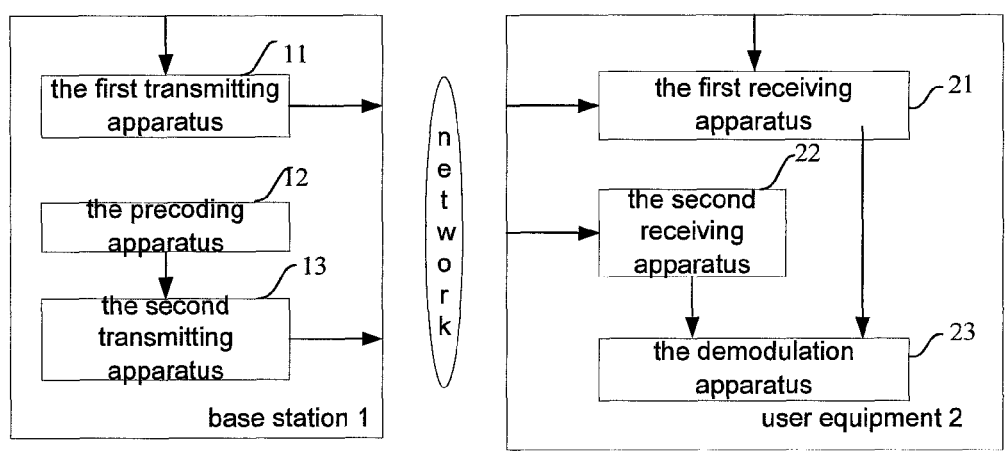
FIG. 1 illustrates a device schematic diagram of a base station and a user equipment for obtaining downlink data in a massive MIMO system according to one aspect of the present application.

FIG. 1 illustrates a base station 1 and a user equipment 2 for obtaining downlink data in a massive MIMO system according to one aspect of the present application. Here, the massive MIMO system includes, but not limited to, an OFDM (Orthogonal Frequency Division Multiplexing) massive MIMO system, an SC-FDMA (Single-carrier Frequency-Division Multiple Access) massive MIMO system, an FBMC (Filter Bank MultiCarrier) massive MIMO system, etc. In these systems, each base station is configured with a plurality of antennas and meanwhile supports a plurality of user equipment. Preferably, each base station (e.g., base station 1) in these systems simultaneously supports a plurality of user equipments; moreover, the number of supported user equipments is far less than the number of antennas configured to the base station (e.g., base station 1).

Particularly, the base station 1 comprises a first transmitting apparatus 11, a precoding apparatus 12, and a second transmitting apparatus 13; the user equipment 2 comprises a first receiving apparatus 21, a second receiving apparatus 22, and a demodulating apparatus 23. Specifically, the first transmitting apparatus 11 of the base station 1 transmits a downlink control signaling indicating downlink channel estimation information to corresponding user equipment 2, wherein the downlink control signaling comprises corresponding effective channel mean value information; correspondingly, the first receiving apparatus 21 of the user equipment 2 receives the downlink control signaling indicating downlink channel estimation information, which is transmitted by the corresponding base station 1, wherein the downlink control signaling comprises corresponding effective channel mean value information; the precoding apparatus 12 of the base station 1 performs zero-forcing precoding to the to-be-transmitted signal on each subcarrier of the transmission sub-band; the second transmitting apparatus 13 transmits the zero-forcing precoded signal to the user equipment 2; correspondingly, the second receiving apparatus 22 of the user equipment 2 receives signals which are transmitted by the base station 1 and derived from performing zero-forcing precoding to the to-be-transmitted signal on each subcarrier of the transmission sub-band; the demodulation apparatus 23 performs demodulation processing to the signal according to the effective channel mean value information to obtain corresponding downlink data.

Here, the base station 1 refers to a device that connects a fixed part and a wireless part in a mobile communication system and is connected to a mobile station via an air wireless transmission, including, but not limited to, Node B base station, eNB base station, etc. Here, user equipment 2 refers to a portion, in a mobile communication device, which terminates wireless transmission to or from a network and adapts capabilities of a terminal device to wireless transmission, i.e., a device that accesses a user to a mobile network, which includes, but not limited to, any electronic product that performs human-machine interaction with the user through a keyboard, a touch pad, or a voice-control device and achieve transmission of mobile communication signals through mutual transmission and reception of signals with the base station through a mobile network, e.g., a tablet computer, a smart phone, a PDA, a vehicle computer, etc. Here, the mobile network includes, but not limited to, GSM, 3G, LTE, Wi-Fi, WiMax, WCDMA, CDMA2000, TD-SCDMA, HSPA, LTD, etc. Those skilled in the art should understand that the user equipment, mobile network, and base station are only examples, and other existing or future possibly emerging user equipments or mobile networks or base stations, if applicable to the present application, should also be included within the protection scope of the present application, and are incorporated here by reference.

Specifically, the first transmitting apparatus 11 of the base station 1 transmits downlink control signaling indicating downlink channel estimation information to a corresponding user equipment 2 through the wireless channel, e.g., in a periodical transmission manner and a broadcast manner, etc., wherein the downlink control signaling includes corresponding effective channel mean value information. Here, the effective channel mean value information corresponds to downlink channel estimation information transmitted by the base station 1 to the user equipment 2. The effective channel mean value information may be represented as $\{(1+a_k)\sqrt{p_k}, k=1K\}$ where $a_k$ is represented by equation (1) below:

$$a_k = -\frac{\sigma_{e,k}^2}{g_k + \sigma_{e,k}^2} \quad (1)$$

$p_k$ is an average transmit power of the kth user equipment. In equation (1) above, $\sigma_{e,k}^2$ is the variance of CSIT (Channel State Information at the Transmitter) error of the kth user equipment in the K user equipments supported by the base station 1, and $g_k$ is pathloss of the kth user equipment.

Hereinafter, it will be illustrated, through an example, why $\{(1+a_k)\sqrt{p_k}, k=1\sim K\}$ may be used to represent the effective channel mean value information:

For example, consider a DL OFDM massive MIMO system with $N_{FFT}$ subcarriers, suppose it is a TDD (Time Division Duplexing) system; so that the base station in the system can obtain CSI (Channel State Information) from UL (uplink) sounding based on channel exchangeability; suppose a base station in the system is equipped with $N_T$ antennas, and K user equipments are simultaneously supported via multiuser precoding; and each user equipment has one antenna.

For base station 1, a $K*N_T$-dimension channel matrix over the wth subcarrier between K user equipments and $N_T$ antennas is denoted by Hw. Suppose $g_k$ is the path-loss of the kth user equipment, then:

$$E(H_w H_w^H) = N_T G \qquad (2)$$

where $G=\text{diag}([g_1 \ldots g_k \ldots g_K])$, i.e., G is a diagonal matrix with $g_k$ as the $k^{th}$ diagonal element. using UL/DL channel reciprocity in TDD, the base station 1 can obtain estimate of $H_w$, denoted as $H_w^{(e)}$. The CSIT (Channel State Information at the Transmitter) error is denoted as:

$$\Delta H_w = H_w - H_w^{(e)} \qquad (3)$$

The channel state information error might come from uplink channel estimation error and channel aging. $\Delta H_w$ is independent of $H_w$ and has:

$$E(\Delta H_w \Delta H_w^H) = N_T \Delta G \qquad (4)$$

where, $\Delta G = \text{diag}([\sigma_{e,1}^2 \ldots \sigma_{e,k}^2 \ldots \sigma_{e,K}^2])$ is a diagonal matrix; the kth diagonal element denoted as $\sigma_{e,k}^2$ is the variance of CSIT error of the kth user equipment. According to equation (3) and equation (4), derive:

$$E(H_w^{(e)} H_w^{(e)H}) = E((H_w - \Delta H_w)(H_w - \Delta H_w)^H) = N_T(G + \Delta G) \qquad (5)$$

The base station 1 uses zero-forcing to calculate the precoding matrix of each sub-carrier as:

$$W_w = H_w^{(e)H}(H_w^{(e)} H_w^{(e)H})^{-1} P^{1/2}, w=1 \cdot NFFT \qquad (6)$$

P is a diagonal matrix with $p_k$ the kth diagonal element $p_k$. P is selected such that $E(|W_w|^2)=1$, where the expectation is taken over w. Given the number K of the user equipments, the value of $p_k$ increases linearly with $N_T$. And the expectation of $p_k$ can be approximated as:

$$E(p_k) = (g_k + \sigma_{e,k}^2) \frac{N_T - K}{K} \qquad (7)$$

At the user equipment side, the received signal on the wth subcarrier is:

$$y_w = H_w W_w x_w + n_w = (H_w^{(e)} + \Delta H_w) W_w x_w + n_w \qquad (8)$$

Based on equations (3) and (4), it may be derived:

$$E(\Delta H_w H_w^{(e)H}) = E(\Delta H_w (H_w - \Delta H_w)^H) = -N_T \Delta G \qquad (9)$$

Therefore, $\Delta H_w$ can be modeled as:

$$\Delta H_w = A H_w^{(e)} + B_w \qquad (10)$$

Where A is a constant matrix, $B_w$ is a random matrix independent of $H_w^{(e)}$. Based on equation (10), it may be derived:

$$E(\Delta H_w H_w^{(e)H}) = E((A H_w^{(e)} + B_w) H_w^{(e)H}) = N_T A(G+\Delta G) \qquad (11)$$

and $$E(\Delta H_w \Delta H_w^H) = E((A H_w^{(e)} + B_w)(A H_w^{(e)} + B_w)^H) = N_T A A^H (G+\Delta G) + E(B_w B_w^H) \qquad (12)$$

Comparing equations (11) and (12) with equations (9) and (4), it may be derived:

$$A = \text{diag}([a_1 \ldots a_k \ldots a_K]) \qquad (13)$$

where $a_k$ is expressed by equation (1), and $E(B_w B_w^H) = N_T A G$. By substituting equation (10) into equation (8), it may be derived:

$$y_w = (I+A)P^{1/2} x_w + B_w W_w x_w + n_w \qquad (14)$$

Consider a particular user equipment k, the received signal can be written as:

$$y_{w,k} = (1+a_k)\sqrt{p_k}\, x_{w,k} + B_w(k,:)W_w(:,k)x_{w,k} + \sum_{k' \neq k} B_w(k,:)W_w(:,k')x_{w,k'} + n_{w,k} \qquad (15)$$

where $B_w(k,:)$ represents the kth line of the matrix $B_w$, $W_w(:,k)$ denotes the kth column of the matrix $W_w$, and $n_{w,k}$ denotes a white Gaussian noise. Then, for the user equipment k, the effective channel is:

$$h_k^{(eff)} = (1+a_k)\sqrt{p_k} + B_w(k,:)W_w(:,k) \qquad (16)$$

The mean value of the effective channel is $\{(1+a_k)\sqrt{p_k}, k=1\sim K\}$. With per subcarrier precoding, it is hard to insert a reference signal as in conventional MIMO system. So the user equipment cannot get an accurate estimate of the effective channel. Instead, the base station 1 can send a downlink control signaling indicating downlink channel estimation information to a corresponding user equipment, wherein the downlink control signaling comprises corresponding effective channel mean value information $\{(1+a_k)\sqrt{p_k}, k=1\sim K\}$. With only the mean value information of the effective channel, the user equipment k treats the second item of the right side in the equation (15) as interference, although it contains the wanted signal $X_{w,k}$.

The per subcarrier precoding of the present application avoids extra multi-user interference brought by per-subband precoding in the prior art. Compared with the prior technology of performing DL channel estimation using a DL reference signal, the present application does not need the DL reference signal, which only needs to transmit mean value of an effective channel through a control signaling. Because the mean value of the effective channel is only related to the user equipment k, it is unchanged over the entire bandwidth, and the signal overheads as needed are relatively low.

Correspondingly, the first receiving apparatus 21 of the user equipment 2 receives downlink control signaling indicating downlink channel estimation information which is transmitted by the corresponding base station 1 via wireless channel, wherein the downlink control signaling includes corresponding effective channel mean value information.

The precoding apparatus 12 of the base station 1 performs zero-forcing precoding to to-be-transmitted signals on each subcarrier of the transmission sub-band. Specifically, the precoding apparatus 12 first uses zero-forcing to determine a precoding matrix corresponding to the each subcarrier based on channel state information corresponding to each subcarrier of a transmission sub-band; then, based on the precoding matrix, performs zero-forcing precoding to the to-be-transmitted signal on the each subcarrier.

For example, for a DL OFDM massive MIMO system with $N_{FFT}$ subcarriers, one base station in the system is configured with $N_T$ antennas and meanwhile supports K user equipment; moreover, each user equipment has one antenna; then, for the precoding apparatus 12 of the base station 1 in the system, it can use the equation (6) to get the precoding matrix corresponding to each subcarrier; and then the precoding apparatus 12 performs zero-forcing encoding to the to-be-transmitted signal on the corresponding sub-carrier. The precoding matrix on each subcarrier is calculated based on the CSIT on the subcarrier; therefore, the precoding matrices on different subcarriers are different.

The second transmitting apparatus 13 transmits the zero-forcing precoded signal to the user equipment 2 via a wireless channel.

Correspondingly, a second receiving apparatus 22 of the user equipment 2 receives the zero-forcing precoded signal transmitted by the base station 1 on each subcarrier of the transmission sub-band.

The demodulation apparatus 23 performs demodulation processing to the signal based on the effective channel mean value information so as to obtain corresponding downlink data. For example, suppose the user equipment 2 is the kth user equipment in K user equipments supported by the base station 1, and its first receiving apparatus 21 receives the downlink control signaling, which indicates downlink channel estimation information, transmitted by the base station 1, wherein the downlink control signaling includes corresponding effective channel mean value information such as $\{(1+a_k)\sqrt{p_k}, k=1\sim K\}$, then the demodulation apparatus 23 can treat the) effective channel mean value information $\{(1+a_k)\sqrt{p_k}, k=1\sim K\}$ as effective channel state information, and performs demodulation processing to the signal received by its second receiving apparatus 22 using the effective channel mean value information so as to obtain corresponding downlink data, i.e., demodulating the signals received on each sub-carrier, respectively, to obtain downlink data transmitted on each subcarrier. In other words, the demodulation result of each subcarrier is an estimate of the signal transmitted on the subcarrier.

Here, those skilled in the art should understand that in preferred embodiments, the first transmitting apparatus 11 and the second transmitting apparatus 13 of the base station 1 may be executed in parallel or executed in series; the first receiving apparatus 21 and the second receiving apparatus 22 of the user equipment 2 may be executed in parallel and also executed in series.

Respective apparatuses of the base station 1 and the user equipment 2 work constantly between each other. Specifically, the first transmitting apparatus 11 of the base station 1 constantly transmits downlink control signaling indicating downlink channel estimate information to a corresponding user equipment 2, wherein the downlink control signaling comprises corresponding effective channel mean value information; correspondingly, the first receiving apparatus 21 of the user equipment 2 constantly receives the downlink control signaling indicating downlink channel estimation information transmitted by the corresponding base station 1, wherein the downlink control signaling includes corresponding effective channel mean value information; the precoding apparatus 12 of the base station 1 constantly performs zero-forcing precoding to the to-be-transmitted signal on each subcarrier of the transmission sub-band; the second transmitting apparatus 13 transmits the zero-forcing precoded signal to the user equipment 2; correspondingly, the second receiving apparatus 22 of the user equipment 2 receives signals which are transmitted by the base station 1 and derived from performing zero-forcing precoding to the to-be-transmitted signal on each subcarrier of the transmission sub-band; the demodulation apparatus 23 constantly performs demodulation processing to the signal according to the effective channel mean value information so as to obtain corresponding downlink data. Here, those skilled in the art should understand that "constantly" refers to respectively apparatuses of the base station 1 and the user equipment 2 constantly transmits and receives the downlink control signaling, performs zero-forcing precoding to the to-be-transmitted signal, transmits and receives the zero-forcing precoded signal, and demodulates the signal between each other, till the base station halts transmission of the downlink control signaling within a relatively long time.

Preferably, the base station 1 further comprises a determining apparatus (not shown). Specifically, the determining apparatus determines the effective channel mean value information based on relevant information of the user equipment; wherein the relevant information comprises:
 rate of the user equipment;
 signal-to-noise ratio of an uplink sounding reference signal transmitted by the user equipment;
 long-time channel fading of the user equipment.

For example, suppose the user equipment 2 is the kth user equipment in K user equipments supported by base station 1; then the determining apparatus may obtain in advance correspondence relationships between signal-to-noise ratios of different uplink sounding reference signals transmitted by the user equipment 2 and the variances of CSIT errors of the user equipment 2; then based on the actually measured signal-to-noise ratio of the uplink sounding reference signal, the variance of the current CSIT error of the user equipment 2 is obtained through the manner of table lookup and the like, i.e., deriving $\sigma_{e,k}^2$. Next, the effective channel mean value information of the user equipment 2 is calculated according to equation (1).

For another example, suppose the user equipment 2 is the kth user equipment in K user equipments supported by base station 1; then the determining apparatus may first estimate a channel estimate error variance caused by channel time variation of the user equipment 2 by an empirical value based on a rate of the user equipment 2; then, estimates a channel estimation error variance caused by the uplink channel estimation error based on the signal-to-noise ratio estimation of the uplink sounding reference signal transmitted by the user equipment 2; by adding the two variances, the variance of the current CSIT error of the user equipment 2 may be obtained, thereby deriving $\sigma_{e,k}^2$. Next, effective channel mean value information of the user equipment 2 is calculated according to equation (1).

Those skilled in the art should understand that the above manner of determining the effective channel mean value information based on relevant information of the user equipment is only an example, or those that can possibly come out later should also be contained in the protection scope of the application and included here in a way of quotation, if they are adaptable to this application.

Hereinafter, the performance advantages of the present application against the per-sub-band precoding scheme based on the DL reference signal in the prior art will be illustrated:

1) Now, analysis is first made to the massive MIMO system based on the per-sub-band precoding with a DL reference signal:

Suppose in the traditional OFDM-MIMO system, the $N_{FFT}$ subcarriers are divided into $L_{SB}$ sub-bands, each containing $N_{SB}$ consecutive subcarriers. The DL multiuser precoding is performed on a per sub-band basis as follow:

$$W_b = \overline{H}_b^H (\overline{H}_b \overline{H}_b^H)^{-1} P^{1/2}, b=1 \sim LSB \quad (17)$$

where P is a diagonal matrix with $P_k$ the kth diagonal element. $\{p_k, k=1 \sim K\}$ are selected such that $$E|W_b|^2 = 1 \quad (18)$$

and $$\overline{H}_b = \frac{1}{N_{SB}} \sum_{i=1}^{SB} H_{(b-1)N_{SB}+i}^{(e)} \quad (19)$$

In (6), the expectation is taken over b. For a fixed user number K, the value of $p_k$ increases linearly with the BS antenna number $N_T$. Using the property of Wishart matrix, the expectation of $p_k$ can be estimated as $$E(p_k) = E(\overline{H}_b(k,:) \overline{H}_b^H(k,:)) \frac{N_T - K}{K} \quad (20)$$

At a user equipment side, me signal received on the ith subcarrier of the bth sub-band is $$y_{b,i} = H_{(b-1)N_{SB}+i} W_b x_{(b-1)N_{SB}+i} + n_{(b-1)N_{SB}+i} \quad (21)$$

$$= (\overline{H}_b + \Delta \overline{H}_{(b-1)N_{SB}+i}) W_b x_{(b-1)N_{SB}+i} + n_{(b-1)N_{SB}+i}$$

$$= P^{1/2} x_{(b-1)N_{SB}+i} + \Delta \overline{H}_{(b-1)N_{SB}+i} W_b x_{(b-1)N_{SB}+i} + n_{(b-1)N_{SB}+i}$$

where $\Delta \overline{H}_{(b-1)N_{SB}+i} = H_{(b-1)N_{SB}+i} - \overline{H}_b = \Delta H_{(b-1)N_{SB}+i} + H_{(b-1)N_{SB}+i}^{(e)} - \overline{H}_b$ (22)

is CSIT error, which includes both the error (denoted as $\Delta H_{(b-1)N_{SB}+i}$ in equation (22)) caused by UL channel estimation error, channel aging and the error (denoted as $H_{(b-1)N_{SB}+i}^{(e)} - \overline{H}_b$ in equation (22)) caused by per-sub-band average CSIT shown in equation (19) instead of per subcarrier CSIT. Consider a particular user equipment k, the received signal can be written as:

$$y_{b,i,k} = \sqrt{p_k} x_{(b-1)N_{SB}+i,k} + \Delta \overline{H}_{(b-1)N_{SB}+i}(k,:) W_b x_{(b-1)N_{SB}+i} + n_{(b-1)N_{SB}+i,k} \quad (23)$$

$$= (\sqrt{p_k} + \Delta \overline{H}_{(b-1)N_{SB}+i}(k,:) W_b(:,k)) x_{(b-1)N_{SB}+i,k} + \sum_{k' \neq k} \Delta \overline{H}_{(b-1)N_{SB}+i}(k,:) W_b(:,k') x_{(b-1)N_{SB}+i,k'} + n_{(b-1)N_{SB}+i,k}$$

where A(k,:) and A(:,k) denote the kth row and kth column of matrix A, respectively, $x_k$ and $n_k$ the kth element of x and n, respectively. The second term in equation (23) is a multi-user interference caused by the CSIT error $\{\Delta \overline{H}_w\}$. When $N_{SB} > 1$, $\{\Delta \overline{H}_w\}$ not only includes $\{\Delta H_w\}$, but also includes extra multiuser interference error caused by per sub-band precoding.

2) Performance advantage analysis of the present application over the prior art:

Suppose $\alpha(w_2 - w_1)$ denote the normalized frequency channel correlation between the $w_1$th subcarrier and the $w_2$th subcarrier, as $$\alpha(w_2 - w_1) = \frac{1}{N_T} E(H_{w_1} H_{w_2}^H) G^{-1} \quad (24)$$

Suppose $\alpha(w_2 - w_1)$ has the same normalized frequency correlation, so $$E(\Delta H_{w_1} \Delta H_{w_2}^H) = \alpha(w_2 - w_1) N_T \Delta G \quad (25)$$

and $$E(H_{w_1}^{(e)} H_{w_2}^{(e)H}) = \alpha(w_2 - w_1) N_T (G + \Delta G) \quad (26)$$

The expectations in equations (24)-(26) are taken over multiple realizations of $\{H_w, \forall w\}$ and $\{\Delta H_w, \forall w\}$. For notification simplicity, define $$H_{b,i} = H_{(b-1)N_{SB}+i} \quad (27)$$

Where H can be replaced by $\Delta H$, $H^{(e)}$ or $\Delta \overline{H}$. Combining equations (24)-(27), and (19) and (22), it can be calculated that $$E(H_{b,i} \overline{H}_b^H) = \frac{1}{N_{SB}} E\left(\sum_{j=1}^{N_{SB}} H_{b,i}(H_{b,j}^H + \Delta H_{b,j}^H)\right) = \frac{N_T}{N_{SB}} \sum_{j=1}^{N_{SB}} \alpha(j-i) G \quad (28)$$

$$E(\overline{H}_b \overline{H}_b^H) = \frac{1}{N_{SB}^2} E\left(\sum_{j,j'} H_{b,j}^{(e)} H_{b,j'}^{(e)H}\right) = \frac{N_T}{N_{SB}^2} \sum_{j,j'} \alpha(j'-j)(G + \Delta G) \quad (29)$$

$$E(\Delta \overline{H}_{b,i} \overline{H}_{b,i}^H) = \quad (30)$$
$$E((H_{b,i} - \overline{H}_b)(H_{b,i} - \overline{H}_b)^H) = E(H_{b,i} H_{b,i}^H + \overline{H}_b \overline{H}_b^H - 2\text{Re}(H_{b,i} \overline{H}_b^H)) =$$
$$N_T G + \frac{N_T}{N_{SB}^2} \sum_{j,j'} \alpha(j'-j)(G + \Delta G) - \frac{2N_T}{N_{SB}} \text{Re}\left(\sum_j \alpha(j-i)\right) G$$

Define $$r_i = \frac{N_T}{N_{SB}} \sum_{j=1}^{N_{SB}} \alpha(j-i) \quad (31)$$

and $$\sigma_{ave}^2 = \frac{N_T}{N_{SB}^2} \sum_{j,j'} \alpha(j'-j) \quad (32)$$

Based on (31) and (32), (28)-(30) can be simplified as $$E(H_{b,i}\overline{H}_b{}^H) = r_i G \tag{33}$$

$$E(\overline{H}_b\overline{H}_b{}^H) = \overline{\sigma}_{ave}^2 (G + \Delta G) \tag{34}$$

and $$E(\Delta\overline{H}_{b,i}\Delta\overline{H}_{b,i}{}^H) = N_T G + \overline{\sigma}_{ave}^2 (G + \Delta G) - 2r_i^{(Re)} G \tag{35}$$

Based on (33) and (34), it may be derived $$E(\Delta\overline{H}_{b,i}\overline{H}_b{}^H) = E((H_{b,i} - \overline{H}_b)\overline{H}_b{}^H) = (r_i - \overline{\sigma}_{ave}^2) G - \overline{\sigma}_{ave}^2 \Delta G \tag{36}$$

Therefore, $\Delta\overline{H}_{b,i}$ can be written as $$\Delta\overline{H}_{b,i} = C_i \overline{H}_b + D_{b,i} \tag{37}$$

where $c_i$ is a constant matrix and $D_{b,i}$ a random matrix independent of $\overline{H}_b$ with zero mean. Based on (37), we have $$E(\Delta\overline{H}_{b,i}\overline{H}_b{}^H) = E((C_i\overline{H}_b + D_{b,i})\overline{H}_b{}^H) = \overline{\sigma}_{ave}^2 C_i (G + \Delta G) \tag{38}$$

and $$E(\Delta\overline{H}_{b,i}\Delta\overline{H}_{b,i}{}^H) = E((C_i\overline{H}_b + D_{b,i})(C_i\overline{H}_b + D_{b,i})^H) = \overline{\sigma}_{ave}^2 C_i C_i^H (G + \Delta G) + E(D_{b,i} D_{b,i}{}^H) \tag{39}$$

Comparing equations (38) and (39) with equations (36) and (35), we have:

$$C_i = \text{diag}([c_{i,1} \ldots c_{i,k} \ldots c_{i,K}]) \tag{40}$$

Where $$c_{i,k} = \frac{(r_i - \overline{\sigma}_{ave}^2) g_k - \overline{\sigma}_{ave}^2 \sigma_{e,k}^2}{\overline{\sigma}_{ave}^2 (g_k + \sigma_{e,k}^2)} \tag{41}$$

and $$E(D_{b,i} D_{b,i}{}^H) = \sigma_{D,i}^2 N_T I \tag{42}$$

where $$\sigma_{D,i}^2 = g_k + \overline{\sigma}_{ave}^2 (1 - |c_{i,k}|^2)(g_k + \sigma_{e,k}^2)/N_T - 2r_i^{(Re)} g_k / N_T \tag{43}$$

Substituting equation (37) into (23), t the signal received by the kth user on the ith subcarrier in the bth sub-band can be written as $$y_{b,i} = H_{(b-1)N_{SB}+i,k} + (c_{i,k}\overline{H}_b(k,:) + D_{b,i}(k,:))W_b x_{(b-1)N_{SB}+i} + n_{(b-1)N_{SB}+i,k}$$

$$= (1 + c_{i,k})\sqrt{p_k} x_{(b-1)N_{SB}+i,k} + D_{b,i}(k,:)W_b(:,k)x_{(b-1)N_{SB}+i,k} + \sum_{k' \neq k} D_{b,i}(k,:)W_b(:,k')x_{(b-1)N_{SB}+i,k'} + n_{(b-1)N_{SB}+i,k} \tag{44}$$

1) Average signal-to-noise ratio of the signal received in the user equipment in the prior art:

In this case, $N_{SB} > 1$ and reference signals are inserted in each sub-band for users to estimate their effective channels. Then the average SINR of the signals received by the kth user can be calculated as $$\gamma_k^{(SB)} = \frac{E\left(\left|(1 + c_{i,k})\sqrt{p_k} + D_{b,i}(k,:)W_b(:,k)x_{(b-1)N_{SB}+i,k}\right|^2\right)}{E\left(\left|\sum_{k' \neq k} D_{b,i}(k,:)W_b(:,k')x_{(b-1)N_{SB}+i,k'}\right|^2\right) + \sigma^2} \tag{45}$$

$$= \frac{E(|1 + c_{i,k}|^2)E(p_k) + E(\sigma_{D,i}^2)/K}{E(\sigma_{D,i}^2)(K-1)/K + \sigma^2}$$

$$\stackrel{(a)}{=} \frac{E(|1 + c_{i,k}|^2)\overline{\sigma}_{ave}^2(g_k + \sigma_{e,k}^2)(N_T - K)/K + E(\sigma_{D,i}^2)/K}{E(\sigma_{D,i}^2)(K-1)/K + \sigma^2}$$

where eqn. (a) in equation (45) is derived from equations (20) and (34), The expectations in the (a) of (45) are taken over $i = 1 \sim N_{SB}$.

II) Average signal-to-noise ratio of the signal received by the user equipment in the present application:

In this case, $N_{SB} = 1$; therefore, $r_i = N_T$, $\overline{\sigma}_{ave}^2 = N_T$, $c_{i,k} = a_k$, and $\sigma_{D,i}^2 = -g_k a_k$, where $a_k$ is defined in equation (1). Each user equipment k only knows the mean value of its own effective channel, i.e., $$\overline{h}_k^{(eff)} = (1 - c_{i,k})\sqrt{p_k} = (1 + a_k)\sqrt{p_k} \tag{46}$$

Therefore, the second term in equation (44) should be regarded as interference, although it contains the wanted signal. The average signal-to-noise ratio of the received signal is then calculated as:

$$\gamma_k^{(SC)} = \frac{E\left(\left|(1 + c_{i,k})\sqrt{p_k} x_{(b-1)N_{SB}+i,k}\right|^2\right)}{E\left(\left|\sum_{k'=1}^{K} D_w(k,:)W_b(:,k')x_{(b-1)N_{SB}+i,k'}\right|^2\right) + \sigma^2} \tag{47}$$

$$= \frac{(1 + a_k)^2 E(p_k)}{-g_k a_k + \sigma^2} \stackrel{(a)}{=} \frac{(1 + a_k)^2 (g_k + \sigma_{e,k}^2)(N_T - K)/K}{-g_k a_k + \sigma^2}$$

where eqn. (a) is derived using (7).

III) Comparison between the present application and the prior art: At the ease of comparison, define $$\eta = \frac{\gamma_k^{(SC)}}{\gamma_k^{(SB)}} \tag{48}$$

If $\eta > 1$, it indicates the present application is better than the prior art; if not, the prior art is better than the present application.

Figure 2:
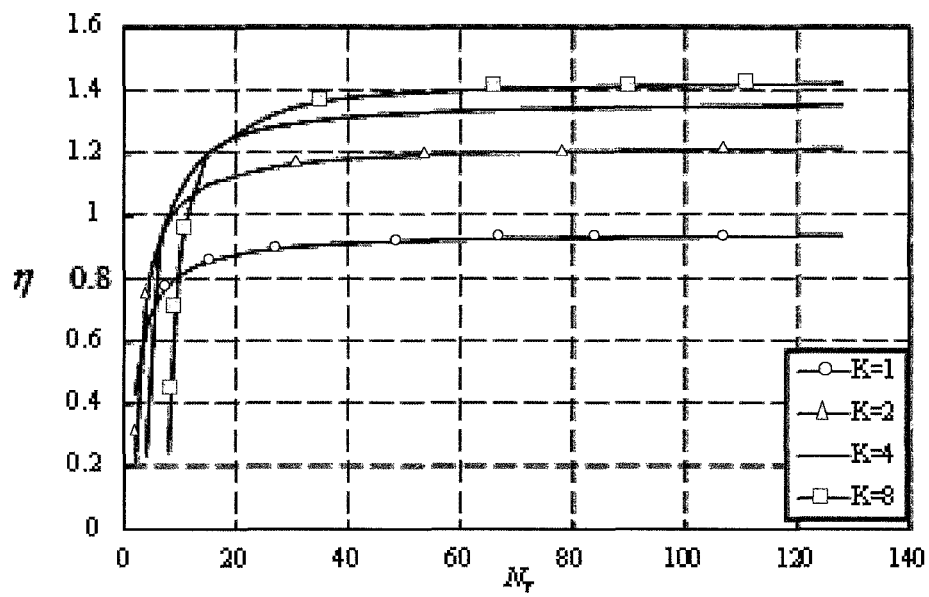
FIG. 2 illustrates a curve diagram of a ratio between average SINR (signal-to-noise ratio) of the signals received by a user equipment in the prior art (using per-sub-band multi-user precoding) and the average SINR of the signals received by a user equipment in the present application with the number K of user equipments is fixed and the number $N_T$ of antennas of the base station is different.
Figure 3:
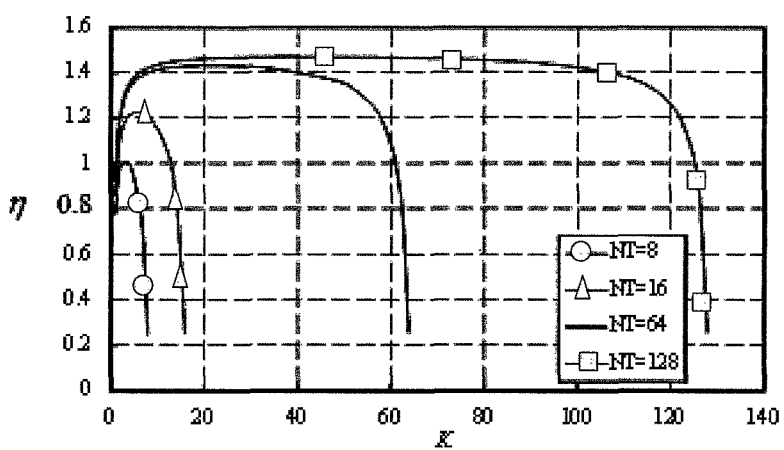
FIG. 3 illustrates a curve diagram of a ratio between average SINR of the signals received by a user equipment in the prior art (using per sub-band multi-user precoding) and the average SINR of the signals received by a user equipment in the present application with the number $N_T$ of antennas of the base station is fixed and the number K of user equipment is different.

Hereinafter, the relationships between $\eta$, $N_T$ and K will be illustrated:

FIG. 2 illustrates a curve of $\eta$ when K is fixed while $N_T$ is different; FIG. 3 illustrates a curve of $\eta$ when NT is fixed while K is different; in FIGS. 2 and 3, the frequency correlation function $\{a(\Delta w)\}$ in equation (24) is derived from simulation using an SCM (Spatial Channel Model) channel model and user equipment velocity of 3 km/h. For all user equipments, the pathloss is set to 1, and for any k, a variance of the CSIT error is set as $\sigma_{e,k}^2 = 0.8$, and the noise variance is set to 1; for per sub-band precoding, the bandwidth is divided into a plurality of sub-bands, each containing $N_{SB} = 60$ consecutive subcarriers.

It can be seen from FIG. 2 that with a fixed user equipment number, per sub-band precoding performs better with a small number of antennas, but with the increase of antenna number, the performance of per subcarrier precoding improves and finally outperforms per sub-band precoding. From this figure, we can also see that when K=1, per sub-band precoding with DL training signals is always better then per subcarrier precoding without DL training, as there is no multiuser interference in this case. However, the gap between the two narrows as $N_T$ grows, which means that the disadvantageous impact of self-interference caused by inaccurate effective channel estimation decreases as the antenna number increases.

It may be seen from FIG. 3 that with a fixed antenna number, per sub-band precoding performs better with a small number of users, but with the increase of user number, the performance of per subcarrier precoding improves and finally outperforms per sub-band precoding. This is because the detrimental impact of per sub-band precoding on multiuser interference becomes more serious as the user number increases. However, if the user number continues increasing to approach the antenna number, per sub-band precoding performs better again. Therefore, preferably, the number of user equipment simultaneously supported by the base station in the present application is far less than the number of antennas configured to.

In addition to the theoretical analysis, we also use simulation results to demonstrate the advantage of the proposed technique. We consider the DL transmission of a MIMO OFDM system with $N_{FFT}=1024$ subcarriers and $N_T$ BS antennas. Simultaneously K users are supported using DL MU-MIMO based on zero-forcing. The path losses are set to 1 and the CSIT error variances at the BS side is set to $\sigma_{e,k}^2=0.8$ for all user equipments.

For per sub-band MU precoding, we assume that all subcarriers are divided into sub-bands each containing $N_{SB}=60$ consecutive subcarriers. The precoding matrix is calculated for each sub-band using the average CSIT of the sub-band. At the user equipment side, we assume that ideal effective channel estimation can be achieved using the DL reference signals in each sub-band.

For the per-subcarrier multi-user precoding, the precoding matrix is calculated individually for each subcarrier. The base station transmits signaling indicating the effective channel mean value information defined in equation (1) to each user equipment.

Figure 4:
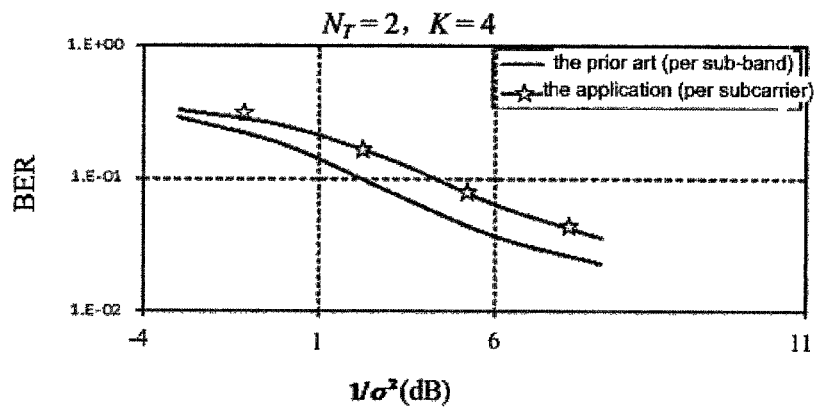
FIG. 4 illustrates a schematic diagram of comparing DL transmission performance between the present application and the prior art (using per sub-band multi-user precoding) with different numbers of antennas and user equipments.
Figure 5:
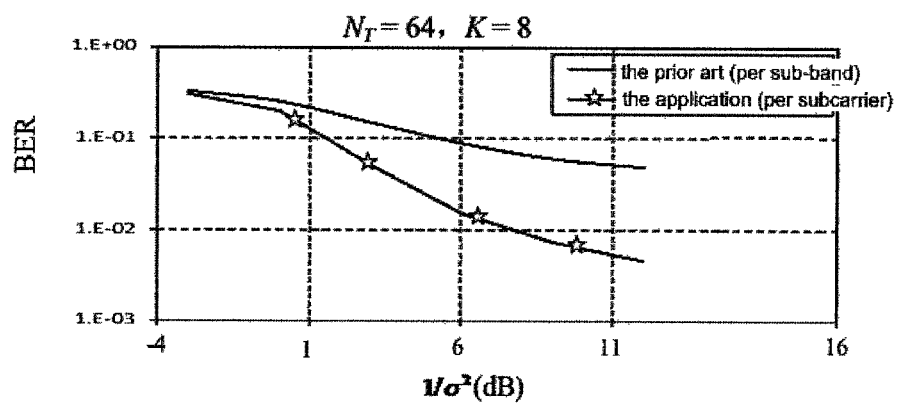
FIG. 5 illustrates another schematic diagram of comparing DL transmission performance between the present application and the prior art (using per sub-band multi-user precoding) with different numbers of antennas and user equipments.

FIGS. 4 and 5 illustrate a schematic diagram of comparing DL transmission performances of the present application and the prior art when the numbers of antennas and user equipments are different.

In FIG. 4, set $N_T=2$ and K=4, and for all user equipments, a QPSK modulation and a Turbo code with a rate of ⅓ are adopted. In FIG. 5, set $N_T=64$ and K=8, and for all user equipments, a 16QAM modulation and a Turbo code with a rate of ⅓ are adopted.

It can be seen from FIG. 4 that for FIG. 4 with a smaller number of antennas, the performance of per sub-band precoding with DL training signal outperforms per-subcarrier precoding without DL training signal.

However, when the number of antennas increases to what is illustrated in FIG. 5, the performance of the per-subcarrier precoding without DL training signal far outperforms the per sub-band precoding with DL training signal. It can be seen from FIG. 5 that the present application can provide a performance gain greater than 5 dB.

Figure 6:
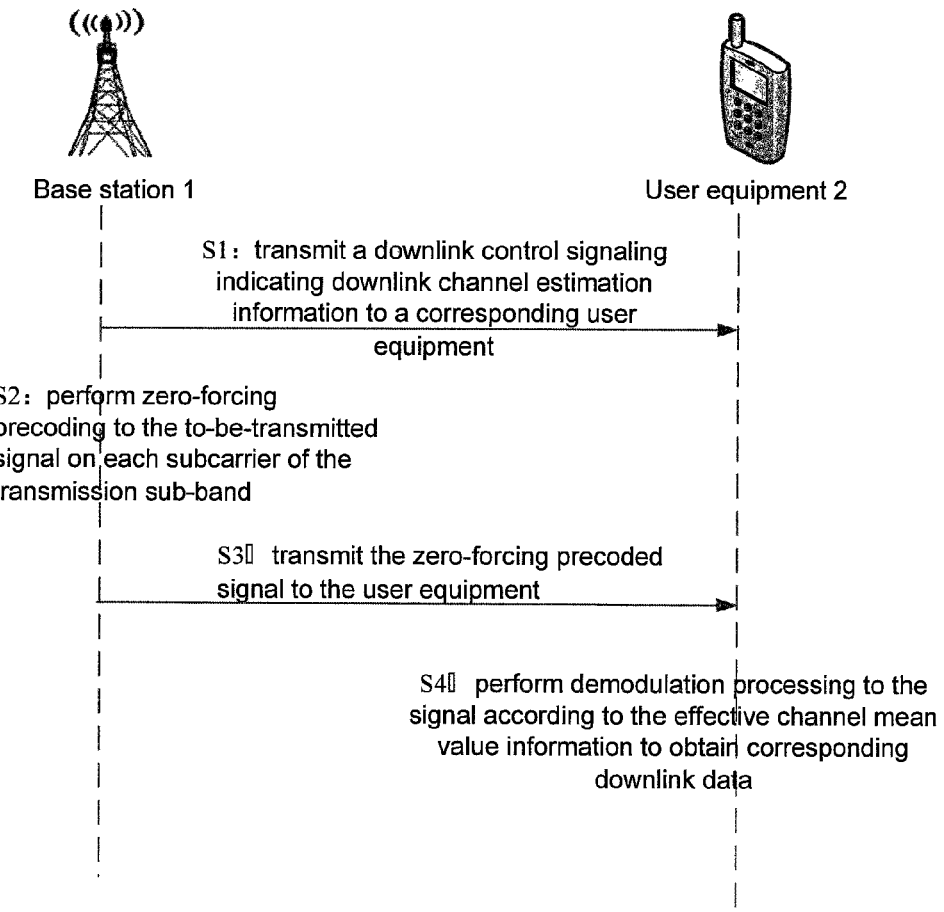
FIG. 6 illustrates a flow diagram of a method for obtaining downlink data in a massive MIMO system with cooperation between the base station and the user equipment according to another aspect of the present application.

FIG. 6 illustrates a flow diagram of a method for obtaining downlink data in a massive MIMO system with cooperation between the base station and the user equipment according to another aspect of the present application.

Here, the massive MIMO system includes, but not limited to, an OFDM (Orthogonal Frequency Division Multiplexing) massive MIMO system, an SC-FDMA (Single-carrier Frequency-Division Multiple Access) massive MIMO system, an FBMC (Filter Bank MultiCarrier) massive MIMO system, etc. In these systems, each base station is configured with a plurality of antennas and meanwhile supports a plurality of user equipment. Preferably, each base station (e.g., base station 1) in these systems simultaneously supports a plurality of user equipments; moreover, the number of supported user equipments is far less than the number of antennas configured to the base station (e.g., base station 1).

Wherein, the method comprises step S1, step S2, step S3 and step S4. Specifically, in the step S1, the base station 1 transmits a downlink control signaling indicating downlink channel estimation information to corresponding user equipment 2, wherein the downlink control signaling comprises corresponding effective channel mean value information; correspondingly, the user equipment 2 receives the downlink control signaling indicating downlink channel estimation information, which is transmitted by the corresponding base station 1, wherein the downlink control signaling comprises corresponding effective channel mean value information; in the step S2, the base station 1 performs zero-forcing precoding to the to-be-transmitted signal on each subcarrier of the transmission sub-band; in the step S3, the base station 1 transmits the zero-forcing precoded signal to the user equipment 2; correspondingly, the user equipment 2 receives signals which are transmitted by the base station 1 and derived from performing zero-forcing precoding to the to-be-transmitted signal on each subcarrier of the transmission sub-band; in the step S4, the user equipment 2 performs demodulation processing to the signal according to the effective channel mean value information to obtain corresponding downlink data.

Here, the base station 1 refers to a device that connects a fixed part and a wireless part in a mobile communication system and is connected to a mobile station via an air wireless transmission, including, but not limited to, Node B base station, eNB base station, etc. Here, user equipment 2 refers to a portion, in a mobile communication device, which terminates wireless transmission to or from a network and adapts capabilities of a terminal device to wireless transmission, i.e., a device that accesses a user to a mobile network, which includes, but not limited to, any electronic product that performs human-machine interaction with the user through a keyboard, a touch pad, or a voice-control device and achieve transmission of mobile communication signals through mutual transmission and reception of signals with the base station through a mobile network, e.g., a tablet computer, a smart phone, a PDA, a vehicle computer, etc. Here, the mobile network includes, but not limited to, GSM, 3G, LTE, Wi-Fi, WiMax, WCDMA, CDMA2000, TD-SCDMA, HSPA, LTD, etc. Those skilled in the art should understand that the user equipment, mobile network, and base station are only examples, and other existing or future possibly emerging user equipments or mobile networks or base stations, if applicable to the present application, should also be included within the protection scope of the present application, and are incorporated here by reference.

Specifically, in the step S1, the base station 1 transmits downlink control signaling indicating downlink channel estimation information to a corresponding user equipment 2 through the wireless channel, e.g., in a periodical transmission manner and a broadcast manner, etc., wherein the downlink control signaling includes corresponding effective channel mean value information. Here, the effective channel mean value information corresponds to downlink channel estimation information transmitted by the base station 1 to the user equipment 2. The effective channel mean value information may be represented as $\{(1+a_k)\sqrt{p_k}, k=1\ K\}$, where $a_k$ is represented by equation (49) below:

$$a_k = -\frac{\sigma_{e,k}^2}{g_k + \sigma_{e,k}^2} \quad (49)$$

$p_k$ is an average transmit power of the kth user equipment. In equation (49) above, $\sigma_{e,k}^2$ is the variance of CSIT (Channel State Information at the Transmitter) error of the kth user equipment in the K user equipments supported by the base station 1, and $g_k$ is pathloss of the kth user equipment.

Hereinafter, it will be illustrated, through an example, why $\{(1+a_k)\sqrt{p_k}, k=1\sim K\}$ may be used to represent the effective channel mean value information:

For example, consider a DL OFDM massive MIMO system with $N_{FFT}$ subcarriers, suppose it is a TDD (Time Division Duplexing) system; so that the base station in the system can obtain CSI (Channel State Information) from UL (uplink)sounding based on channel exchangeability; suppose a base station in the system is equipped with $N_T$ antennas, and K user equipments are simultaneously supported via multiuser precoding; and each user equipment has one antenna.

For base station 1, a $K*N_T$-dimension channel matrix over the wth subcarrier between K user equipments and $N_T$ antennas is denoted by Hw. Suppose $g_k$ is the path-loss of the kth user equipment, then:

$$E(H_w H_w^H) = N_T G \quad (50)$$

where G=diag ($[g_1 \ldots g_k \ldots g_K]$), i.e., G is a diagonal matrix with $g_k$ as the $k^{th}$ diagonal element. using UL/DL channel reciprocity in TDD, the base station 1 can obtain estimate of $H_w$, denoted as $H_w^{(e)}$. The CSIT (Channel State Information at the Transmitter) error is denoted as:

$$\Delta H_w = H_w - H_w^{(e)} \quad (51)$$

The channel state information error might come from uplink channel estimation error and channel aging. $\Delta H_w$ is independent of $H_w$ and has:

$$E(\Delta H_w \Delta H_w^H) = N_T \Delta G \quad (52)$$

where, $\Delta G = \text{diag}([\sigma_{e,1}^2 \ldots \sigma_{e,k}^2 \ldots \sigma_{e,K}^2])$ is a diagonal matrix; the kth diagonal element denoted as $\sigma_{e,k}^2$ is the variance of CSIT error of the kth user equipment. According to equation (51) and equation (52), derive:

$$E(H_w^{(e)} H_w^{(e)H}) = E((H_w - \Delta H_w)(H_w - \Delta H_w)^H) = N_T(G + \Delta G) \quad (53)$$

The base station 1 uses zero-forcing to calculate the precoding matrix of each sub-carrier as:

$$W_w = H_w^{(e)H}(H_w^{(e)} H_w^{(e)H})^{-1} P^{1/2}, w=1\sim NFFT \quad (54)$$

P is a diagonal matrix with $p_k$ the kth diagonal element $p_k$. P is selected such that $E(|W_w|^2)=1$, where the expectation is taken over w. Given the number K of the user equipments, the value of $p_k$ increases linearly with $N_T$. And the expectation of $p_k$ can be approximated as:

$$E(p_k) = (g_k + \sigma_{e,k}^2)\frac{N_T - K}{K} \quad (55)$$

At the user equipment side, the received signal on the wth subcarrier is:

$$y_w = H_w W_w x_w + n_w = (H_w^{(e)} + \Delta H_w) W_w x_w + n_w \quad (56)$$

Based on equations (3) and (4), it may be derived:

$$E(\Delta H_w H_w^{(e)H}) = E(\Delta H_w(H_w - \Delta H_w)^H) = -N_T \Delta G \quad (57)$$

Therefore, $\Delta H_w$ can be modeled as:

$$\Delta H_w = A H_w^{(e)} + B_w \quad (58)$$

Where A is a constant matrix, $B_w$ is a random matrix independent of $H_w^{(e)}$. Based on equation (58), it may be derived:

$$E(\Delta H_w H_w^{(e)H}) = E((A H_w^{(e)} + B_w) H_w^{(e)H}) = N_T A(G + \Delta G) \quad (59)$$

and $$E(\Delta H_w \Delta H_w^H) = E((A H_w^{(e)} + B_w)(A H_w^{(e)} + B_w)^H) = N_T A A^H (G + \Delta G) + E(B_w B_w^H) \quad (60)$$

Comparing equations (59) and (60) with equations (57) and (52), it may be derived:

$$A = \text{diag}([a_1 \ldots a_k \ldots a_K]) \quad (61)$$

where $a_k$ is expressed by equation (49), and $E(B_w B_w^H) = N_T A G$. By substituting equation (58) into equation (56), it may be derived:

$$y_w = (I+A)P^{1/2} x_w + B_w W_w x_w + n_w \quad (62)$$

Consider a particular user equipment k, the received signal can be written as:

$$y_{w,k} = (1+a_k)\sqrt{p_k}\, x_{w,k} + B_w(k,:)W_w(:,k)x_{w,k} + \sum_{k' \neq k} B_w(k,:)W_w(:,k')x_{w,k'} + n_{w,k} \quad (63)$$

where $B_w(k,:)$ represents the kth line of the matrix $B_w$, $W_w(:,k)$ denotes the kth column of the matrix $W_w$, and $n_{w,k}$ denotes a white Gaussian noise. Then, for the user equipment k, the effective channel is:

$$h_k^{(eff)} = (1+a_k)\sqrt{p_k} + B_w(k,:)W_w(:,k) \quad (64)$$

The mean value of the effective channel is $\{(1+a_k)\sqrt{p_k}, k=1\sim K\}$. With per subcarrier precoding, it is hard to insert a reference signal as in conventional MIMO system. So the user equipment cannot get an accurate estimate of the effective channel. Instead, the base station 1 can send a downlink control signaling indicating downlink channel estimation information to a corresponding user equipment, wherein the downlink control signaling comprises corresponding effective channel mean value information $\{(1+a_k)\sqrt{p_k}, k=1\sim K\}$. With only the mean value information of the effective channel, the user equipment k treats the second item of the right side in the equation (63) as interference, although it contains the wanted signal $x_{w,k}$.

The per subcarrier precoding of the present application avoids extra multi-user interference brought by per-subband precoding in the prior art. Compared with the prior technology of performing DL channel estimation using a DL reference signal, the present application does not need the DL reference signal, which only needs to transmit mean value of an effective channel through a control signaling. Because the mean value of the effective channel is only related to the user equipment k, it is unchanged over the entire bandwidth, and the signal overheads as needed are relatively low.

Correspondingly, the user equipment 2 receives downlink control signaling indicating downlink channel estimation information which is transmitted by the corresponding base station 1 via wireless channel, wherein the downlink control signaling includes corresponding effective channel mean value information.

In the step S2, the base station 1 performs zero-forcing precoding to to-be-transmitted signals on each subcarrier of the transmission sub-band. Specifically, in the step S2, the base station 1 first uses zero-forcing to determine a precoding matrix corresponding to the each subcarrier based on channel state information corresponding to each subcarrier of a transmission sub-band; then, based on the precoding matrix, performs zero-forcing precoding to the to-be-transmitted signal on the each subcarrier.

For example, for a DL OFDM massive MIMO system with $N_{FFT}$ subcarriers, one base station in the system is configured with $N_T$ antennas and meanwhile supports K user equipment; moreover, each user equipment has one antenna; then, in the step S2, for the base station 1 in the system, it can use the equation (54) to get the precoding matrix corresponding to each subcarrier; and then the base station 1 performs zero-forcing encoding to the to-be-transmitted signal on the corresponding sub-carrier. The precoding matrix on each subcarrier is calculated based on the CSIT on the subcarrier; therefore, the precoding matrices on different subcarriers are different.

In the step S3, the base station 1 transmits the zero-forcing precoded signal to the user equipment 2 via a wireless channel.

Correspondingly, the user equipment 2 receives the zero-forcing precoded signal transmitted by the base station 1 on each subcarrier of the transmission sub-band.

In the step S4, the user equipment 2 performs demodulation processing to the signal based on the effective channel mean value information so as to obtain corresponding downlink data. For example, suppose the user equipment 2 is the kth user equipment in K user equipments supported by the base station 1, and in the step S1, the user equipment 2 receives the downlink control signaling, which indicates downlink channel estimation information, transmitted by the base station 1, wherein the downlink control signaling includes corresponding effective channel mean value information such as $\{(1+a_k)\sqrt{p_k}, k=1\sim K\}$, then in the step S4, the user equipment 2 can treat the effective channel mean value information $\{(1+a_k)\sqrt{p_k}, k=1\sim K\}$ as effective channel state information, and performs demodulation processing to the signal received in the step S3 using the effective channel mean value information so as to obtain corresponding downlink data, i.e., demodulating the signals received on each sub-carrier, respectively, to obtain downlink data transmitted on each subcarrier. In other words, the demodulation result of each subcarrier is an estimate of the signal transmitted on the subcarrier.

Here, those skilled in the art should understand that in preferred embodiments, the step S1 and the step S3 can be executed in parallel or executed in series.

Respective steps of the base station 1 and the user equipment 2 work constantly between each other. Specifically, in the step S1, the base station 1 constantly transmits downlink control signaling indicating downlink channel estimate information to a corresponding user equipment 2, wherein the downlink control signaling comprises corresponding effective channel mean value information; correspondingly, the user equipment 2 constantly receives the downlink control signaling indicating downlink channel estimation information transmitted by the corresponding base station 1, wherein the downlink control signaling includes corresponding effective channel mean value information; in the step S2, the base station 1 constantly performs zero-forcing precoding to the to-be-transmitted signal on each subcarrier of the transmission sub-band; in the step S3, the base station 1 transmits the zero-forcing precoded signal to the user equipment 2; correspondingly, the user equipment 2 receives signals which are transmitted by the base station 1 and derived from performing zero-forcing precoding to the to-be-transmitted signal on each subcarrier of the transmission sub-band; in the step S4, the user equipment 2 constantly performs demodulation processing to the signal according to the effective channel mean value information so as to obtain corresponding downlink data. Here, those skilled in the art should understand that "constantly" refers to respectively steps of the base station 1 and the user equipment 2 constantly transmits and receives the downlink control signaling, performs zero-forcing precoding to the to-be-transmitted signal, transmits and receives the zero-forcing precoded signal, and demodulates the signal between each other, till the base station halts transmission of the downlink control signaling within a relatively long time.

Preferably, the method further comprise step S5 (not shown). Specifically, in the step S5, the base station 1 determines the effective channel mean value information based on relevant information of the user equipment; wherein the relevant information comprises:
rate of the user equipment;
signal-to-noise ratio of an uplink sounding reference signal transmitted by the user equipment;
long-time channel fading of the user equipment.

For example, suppose the user equipment 2 is the kth user equipment in K user equipments supported by base station 1; then in the step S5, the base station 1 can obtain in advance correspondence relationships between signal-to-noise ratios of different uplink sounding reference signals transmitted by the user equipment 2 and the variances of CSIT errors of the user equipment 2; then based on the actually measured signal-to-noise ratio of the uplink sounding reference signal, the variance of the current CSIT error of the user equipment 2 is obtained through the manner of table lookup and the like, i.e., deriving $\sigma_{e,k}^2$. Next, the effective channel mean value information of the user equipment 2 is calculated according to equation (49).

For another example, suppose the user equipment 2 is the kth user equipment in K user equipments supported by base station 1; then in the step S5, the base station 1 can first estimate a channel estimate error variance caused by channel time variation of the user equipment 2 by an empirical value based on a rate of the user equipment 2; then, estimates a channel estimation error variance caused by the uplink channel estimation error based on the signal-to-noise ratio estimation of the uplink sounding reference signal transmitted by the user equipment 2; by adding the two variances, the variance of the current CSIT error of the user equipment 2 may be obtained, thereby deriving $\sigma_{e,k}^2$. Next, effective channel mean value information of the user equipment 2 is calculated according to equation (49).

Those skilled in the art should understand that the above manner of determining the effective channel mean value information based on relevant information of the user equipment is only an example, or those that can possibly come out later should also be contained in the protection scope of the application and included here in a way of quotation, if they are adaptable to this application.

It should be noted that the present disclosure may be implemented in software or a combination of software and hardware; for example, it may be implemented by a dedicated integrated circuit (ASIC), a general-purpose computer, or any other similar hardware device. In an embodiment, the software program of the present disclosure may be executed by a processor so as to implement the above steps or functions. Likewise, the software program of the present disclosure (including relevant data structure) may be stored in a computer readable recording medium, for example, a RAM memory, a magnetic or optical driver, or a floppy disk, and similar devices. Besides, some steps of functions of the present disclosure may be implemented by hardware, for example, a circuit cooperating with the processor to execute various functions or steps.

In addition, part of the present application may be applied as a computer program product, e.g., a computer program instruction, which, when being executed by a computer, may invoke or provide a method and/or technical solution according to the present application through operation of the computer. The program instruction that invokes a method of the present application may be stored in a fixed or mobile recording medium, and/or transmitted through broadcast and/or a data flow in other signal carrier medium, and/or stored in a work memory running according to the program instruction in a computer device. Here, an embodiment according to the present application includes an apparatus that includes a memory for storing computer program instructions and a processor for executing program instructions, wherein when being executed by the processor, the computer program instruction triggers the apparatus to carry out the methods and/or technical solutions according to various embodiments of the present application.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

I claim:

1. A method, at a base station end, for obtaining downlink data in a massive MIMO system, comprising:
   transmitting a downlink control signaling indicating downlink channel estimation information to a corresponding user equipment, wherein the downlink control signaling comprises corresponding effective channel mean value information;
   wherein the method further comprises:
   performing zero-forcing precoding to a to-be-transmitted signal on each subcarrier of a transmission sub-band;
   transmitting the zero-forcing precoded signal to the user equipment.

2. The method according to claim 1, wherein, the method further comprising:
   determining said effective channel mean value information based on relevant information of the user equipment;
   wherein, the relevant information comprises:
   rate of the user equipment;
   signal-to-noise ratio of an uplink sounding reference signal transmitted by the user equipment;
   long-time channel fading of the user equipment.

3. The method according to claim 1, wherein the performing comprises:
   based on channel state information corresponding to each subcarrier of the transmission sub-band, determining a precoding matrix corresponding to the each subcarrier by applying a zero-forcing criterion;
   performing zero-forcing precoding to a to-be-transmitted signal on the each subcarrier based on the precoding matrix.

4. The method according to claim 1, wherein the base station simultaneously supports multiple user equipments, and the number of user equipments supported is far less than the number of antennas configured to the base station.

5. A method, at a user equipment end, for facilitating obtaining downlink data in a massive MIMO system, comprising:
   receiving a downlink control signaling indicating downlink channel estimation information, which is transmitted by a corresponding base station, wherein the downlink control signaling comprises corresponding effective channel mean value information;
   wherein the method further comprises:
   receiving a signal transmitted by the base station, wherein, the signal is derived from performing zero-forcing precoding to a to-be-transmitted signal on each subcarrier of a transmission subband;
   performing demodulation processing to the signal according to said effective channel mean value information to obtain corresponding downlink data.

6. A base station end for obtaining downlink data in a massive MIMO system, comprises:
   a first transmitting apparatus configured to transmit a downlink control signaling indicating downlink channel estimation information to a corresponding user equipment, wherein the downlink control signaling comprises corresponding effective channel mean value information;
   wherein base station further comprises:
   a precoding apparatus configured to perform zero-forcing precoding to a to-be-transmitted signal on each subcarrier of a transmission sub-band;
   a second transmitting apparatus configured to transmit the zero-forcing precoded signal to the user equipment.

7. The base station according to claim 6, wherein, the base station further comprises:
   a determining apparatus configured to determine said effective channel mean value information based on relevant information of the user equipment;
   wherein, the relevant information comprises:
   rate of the user equipment;
   signal-to-noise ratio of an uplink sounding reference signal transmitted by the user equipment;
   long-time channel fading of the user equipment.

8. The base station according to claim 6, wherein the first transmitting apparatus configured to:
   based on channel state information corresponding to each subcarrier of the transmission sub-band, determine a precoding matrix corresponding to the each subcarrier by applying a zero-forcing criterion;
   perform zero-forcing precoding to a to-be-transmitted signal on the each subcarrier based on the precoding matrix.

9. The base station according to claim 6, wherein the base station simultaneously supports multiple user equipments, and the number of user equipments supported is far less than the number of antennas configured to the base station.

10. A user equipment end for facilitating obtaining downlink data in a massive MIMO system, comprising:
- a first receiving apparatus configured to receive a downlink control signaling indicating downlink channel estimation information, which is transmitted by a corresponding base station, wherein the downlink control signaling comprises corresponding effective channel mean value information;

wherein the user equipment further comprises:
- a second receiving apparatus configured to receive a signal transmitted by the base station, wherein, the signal is derived from performing zero-forcing precoding to a to-be-transmitted signal on each subcarrier of a transmission sub-band;
- a demodulation apparatus configured to perform demodulation processing to the signal according to said effective channel mean value information to obtain corresponding downlink data.

11. A system for obtaining downlink data in a massive MIMO system, wherein, the system comprises a user equipment according to claim 10 and a base station comprising a first transmitting apparatus configured to transmit a downlink control signaling indicating downlink channel estimation information to a corresponding user equipment, wherein the downlink control signaling comprises corresponding effective channel mean value information, wherein base station further comprises a precoding apparatus configured to perform zero-forcing precoding to a to-be-transmitted signal on each subcarrier of a transmission sub-band, a second transmitting apparatus configured to transmit the zero-forcing precoded signal to the user equipment.

* * * * *